(12) United States Patent
Ou et al.

(10) Patent No.: US 12,355,244 B2
(45) Date of Patent: Jul. 8, 2025

(54) HYBRID SYSTEM AND METHOD FOR DISTRIBUTED VIRTUAL POWER PLANTS INTEGRATED INTELLIGENT NET ZERO

(71) Applicant: NATIONAL CHENG KUNG UNIVERSITY, Tainan (TW)

(72) Inventors: Ting-Chia Ou, Tainan (TW); Hao Tieng, Tainan (TW); Fan-Tien Cheng, Tainan (TW); Tsung-Han Tsai, Tainan (TW); Yu-Yong Li, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 444 days.

(21) Appl. No.: 18/051,521

(22) Filed: Nov. 1, 2022

(65) Prior Publication Data
US 2024/0097444 A1    Mar. 21, 2024

(30) Foreign Application Priority Data
Sep. 16, 2022    (TW) .................................. 111135115

(51) Int. Cl.
*H02J 3/00*    (2006.01)
*G06Q 40/04*    (2012.01)
*G06Q 50/06*    (2012.01)

(52) U.S. Cl.
CPC .............. *H02J 3/008* (2013.01); *G06Q 40/04* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 10,618,137 B2 | 4/2020 | Chen et al. | |
| 2003/0144864 A1* | 7/2003 | Mazzarella | G06Q 30/018 705/412 |
| 2012/0053740 A1* | 3/2012 | Venkatakrishnan | G06Q 50/06 700/291 |
| 2021/0325069 A1* | 10/2021 | Cotton | F24F 5/0021 |
| 2022/0004307 A1* | 1/2022 | Simpson | G06F 1/1632 |
| 2023/0085641 A1* | 3/2023 | Jones | G05B 15/02 700/275 |
| 2024/0070708 A1* | 2/2024 | Park | G06Q 30/0225 |

* cited by examiner

*Primary Examiner* — Nathan L Laughlin
(74) *Attorney, Agent, or Firm* — CKC & Partners Co. LLC

(57) ABSTRACT

Embodiments of the present invention provide a hybrid system and method for distributed virtual power plants integrated intelligent net zero. In this method, a cyber physical agent (CPA) is utilized to collect a carbon emission information and an energy management information, and then an artificial intelligence (AI) optimization model of an intelligent central dispatch platform is utilized to obtain a power dispatch manner of the distributed virtual power plants based on the carbon emission information and the energy management information, such that the power dispatch manner of the distributed virtual power plants meets the requirements of enterprise economic benefits and net zero carbon emissions at the same time.

16 Claims, 2 Drawing Sheets

HYBRID SYSTEM AND METHOD FOR DISTRIBUTED VIRTUAL POWER PLANTS INTEGRATED INTELLIGENT NET ZERO

RELATED APPLICATIONS

This application claims priority to Taiwan Application Serial Number 111135115, filed Sep. 16, 2022, the disclosures of which are incorporated herein by reference in their entireties.

BACKGROUND

Field of Invention

The present invention relates to a system and a method for distributed virtual power plants. More particularly, the present invention relates to a hybrid system and a hybrid method for distributed virtual power plants integrated intelligent net zero.

Description of Related Art

With the rise of the distributed energy resources (DER), the concept of integrating the aggregated power such as regional power plants, demand response, energy storage systems, power distribution systems, and renewable energy power generation is derived, which is called virtual power plant (VPP).

The current virtual power plant is a distributed power plant based on the power grid cloud, which can aggregate various types of electric power through a power aggregation manner and can participate in the power trading free market. The main purpose is to enhance the power dispatching capability and promote the dynamism of the power trading free market.

However, the current virtual power plants do not synchronously consider the carbon information such as carbon footprint. The relationship between energy consumption and carbon footprint is closely related and indispensable. The current virtual power plants cannot effectively integrate with carbon footprint management issues such as carbon verification, carbon reduction and carbon neutrality, and thus it is difficult to help enterprises accelerate the realization of the goal of net zero transformation.

SUMMARY

The purpose of the present invention is to provide a hybrid system and a hybrid method for distributed virtual power plants integrated intelligent net zero, thereby obtaining a manner for dispatching power resources of the distributed virtual power plants. The manner for dispatching the power resources of the distributed virtual power plants can satisfy the requirements of enterprise economic benefit and net zero carbon emission at the same time.

The present invention provides a hybrid method for distributed virtual power plants integrated intelligent net zero. The hybrid method includes the following operations. An economic profit assessing operation is performed to determine whether an economic benefit index is greater than or equal to an economic benefit index threshold. A net-zero assessing operation is performed when a determination result of the economic profit assessing operation is yes, so as to determine whether a net-zero annual carbon emission index is less than or equal to a net-zero annual carbon emission index threshold according to a carbon emission management information. A distributed dispatch allocation on plural distributed virtual power plants is performed, by an intelligent central dispatch platform, based on the net-zero annual carbon emission index when a determination result of the net-zero assessing operation is yes. The distributed dispatch allocation includes a participable capacity that each of the distributed virtual power plants is capable of participating in power trading auxiliary services. A behind-the-meter load demand dispatch is performed, by each of the distributed virtual power plants, according to the distributed dispatch allocation. The behind-the-meter load demand dispatch includes an actual planning participating capacity that each of the distributed virtual power plants actually participates in the power trading auxiliary services. A dispatch demand assessing operation is performed to determine whether an execution rate of the intelligent central dispatch platform after the behind-the-meter load demand dispatch is greater than an execution rate threshold. When a determination result of the dispatch demand assessing operation is yes, a post-dispatch net-zero assessing operation is performed to determine whether the net-zero annual carbon emission index after the behind-the-meter load demand dispatch is less than or equal to the net-zero annual carbon emission index threshold according to the carbon emission management information after the behind-the-meter load demand dispatch. When a determination result of the post-dispatch net-zero assessing operation is no, the distributed dispatch allocation is repeatedly performed until the net-zero annual carbon emission index after the behind-the-meter load demand dispatch is less than or equal to the net-zero annual carbon emission index threshold.

In accordance with one or more embodiments of the invention, the hybrid method further includes: collecting, by plural cyber physical agents (CPAs) before the economic profit assessing operation is performed, a cost information, the carbon emission management information, a raw material information of an enterprise resource planning (ERP) system, a process measuring data of a manufacturing execution system (MES), a weather information, an equipment monitoring information and an energy management information of an intelligent predictive maintenance (IPM) system. The economic profit assessing operation is performed according to the cost information.

In accordance with one or more embodiments of the invention, the hybrid method further includes: re-collecting, by the CPAs, the raw material information of the ERP system and the process measuring data of the MES when the determination result of the economic profit assessing operation or the determination result of the net-zero assessing operation is no, and then re-performing the economic profit assessing operation.

In accordance with one or more embodiments of the invention, the cost information includes a total price ($Cost_{TPC}$) of a power trading platform, a power trading carbon price ($Cost_C$) and a loss cost ($\Sigma D_n$) of operation and maintenance of each equipment. The loss cost ($\Sigma D_n$) of operation and maintenance of each equipment is obtained from the equipment monitoring information. The economic benefit index (B) is represented by:

$$B = \frac{Cost_{TPC} - Cost_C - \sum D_n}{Cost_{TPC}}.$$

In accordance with one or more embodiments of the invention, the carbon emission management information includes a total Greenhouse Gas (GHG) emission ($\Sigma GAS_m$) converted by carbon dioxide equivalents of various types of greenhouse gases and a carbon credit trading volume (Cn). The net-zero annual carbon emission index (Z) is represented by:

$$Z = \Sigma GAS_m - Cn.$$

In accordance with one or more embodiments of the invention, the execution rate of the intelligent central dispatch platform is a ratio of a measured value of a smart meter of the Taiwan Power Company (TPC) to a bid capacity of the intelligent central dispatch platform.

In accordance with one or more embodiments of the invention, the intelligent central dispatch platform performs the distributed dispatch allocation according to following formulas:

$$\alpha_n = GA(Cap_n, Z, CEM);$$

$$Cap_C = \Sigma \alpha_n Cap_n - Lp.$$

$\alpha_n$ is a dispatch weight of one of the distributed virtual power plants, $0 < \alpha_n \leq 1$. GA is an artificial intelligence (AI) algorithm function. $Cap_n$ is the participable capacity of the one of the distributed virtual power plants. Cap c is a participable capacity that the intelligent central dispatch platform can participate in the power trading auxiliary services. CEM is a combination of the equipment monitoring information, the energy management information and the weather information. Lp is a value that the bid capacity of the intelligent central dispatch platform minus the measured value of the smart meter of the TPC.

In accordance with one or more embodiments of the invention, the one of the distributed virtual power plants performs the behind-the-meter load demand dispatch according to following formula:

$$\overline{Cap}_n = CaP_E + CaP_{STO} + CaP_{DER} + CaP_{GEN} - UA_n.$$

$\overline{Cap}_n$ is the actual planning participating capacity of the one of the distributed virtual power plants. $Cap_E$ is a maximum capacity that the one of the distributed virtual power plants can be dispatched for the factory scheduling and energy saving. $Cap_{STO}$ is an available capacity of an energy storage system of the one of the distributed virtual power plants. $Cap_{DER}$ is a maximum capacity of grid-connected distributed energy sources of the one of the distributed virtual power plants. $Cap_{GEN}$ is a diesel generator capacity of the one of the distributed virtual power plants. $UA_n$ is a non-dispatchable capacity that the one of the distributed virtual power plants cannot dispatch. $Cap_E$, $Cap_{STO}$, $Cap_{DER}$, $Cap_{GEN}$ are obtained from the energy management information.

In accordance with one or more embodiments of the invention, the hybrid method further includes the following operations. When the actual planning participating capacity of each of the distributed virtual power plants is greater than a limit threshold, each of the distributed virtual power plants is configured to participate in a bidding of a power trading platform of the TPC by itself. When the actual planning participating capacity of at least one of the distributed virtual power plants is less than or equal to the limit threshold, the intelligent central dispatch platform is configured to aggregate the actual planning participating capacity of each of the distributed virtual power plants, and then the intelligent central dispatch platform is configured to participate in the bidding of the power trading platform according to the dispatch weight and the aggregated actual planning participating capacity of each of the distributed virtual power plants.

In accordance with one or more embodiments of the invention, the hybrid method further includes: performing an integrated analysis operation, after the bidding of the power trading platform, to calculate a post-dispatch economic benefit index according to a post-dispatch cost information. The post-dispatch cost information includes a post-dispatch total price ($\overline{Cost}_{TPC}$) of the power trading platform, a post-dispatch power trading carbon price (Cost) and a post-dispatch loss cost ($\Sigma \overline{D}_n$) of operation and maintenance of each equipment. The post-dispatch loss cost ($\Sigma \overline{D}_n$) of operation and maintenance of each equipment is obtained from the equipment monitoring information of the IPM system and the measured value of the smart meter of the TPC. The post-dispatch economic benefit index ($\overline{B}$) is represented by:

$$\overline{B} = \frac{\overline{Cost}_{TPC} - \overline{Cost}_C - \sum \overline{D}_n}{\overline{Cost}_{TPC}}.$$

In accordance with one or more embodiments of the invention, the hybrid method further includes: when the determination result of the dispatch demand assessing operation is no, the intelligent central dispatch platform is configured to re-perform the distributed dispatch allocation on the distributed virtual power plants based on the net-zero annual carbon emission index after the behind-the-meter load demand dispatch, thereby adjusting the dispatch weight of each of the distributed virtual power plants.

In accordance with one or more embodiments of the invention, the hybrid method further includes: when the net-zero annual carbon emission index after the behind-the-meter load demand dispatch is greater than the net-zero annual carbon emission index threshold, the carbon credit trading volume is adjusted to adjust the net-zero annual carbon emission index, such that the intelligent central dispatch platform re-performs the distributed dispatch allocation on the distributed virtual power plants based on the adjusted net-zero annual carbon emission index.

In accordance with one or more embodiments of the invention, the hybrid method further includes: when the net-zero annual carbon emission index after the behind-the-meter load demand dispatch is greater than the net-zero annual carbon emission index threshold, the dispatch weight of a first distributed virtual power plant of the distributed virtual power plants is increased and the dispatch weight of a second distributed virtual power plant of the distributed virtual power plants is decreased, thereby adjusting the net-zero annual carbon emission index, such that the intelligent central dispatch platform re-performs the distributed dispatch allocation on the distributed virtual power plants based on the adjusted net-zero annual carbon emission index. A first green energy power generation amount of the first distributed virtual power plant is greater than a second green energy power generation amount of the second distributed virtual power plant.

The present invention further provides a hybrid system for distributed virtual power plants integrated intelligent net zero. The hybrid system includes an intelligent central dispatch platform, plural distributed virtual power plants, plural cyber physical agents (CPAs) and a cloud platform. The distributed virtual power plants are communicatively connected to the intelligent central dispatch platform via the cloud platform. The CPAs are communicatively connected to the distributed virtual power plants, respectively. The CPAs are configured to collect a cost information, a carbon emission management information, a raw material information of an ERP system, a process measuring data of a manufacturing execution system (MES), a weather information, an equipment monitoring information and an energy management information of an IPM system. The cloud platform is communicatively connected to the CPAs and configured to perform following operations: generating an economic benefit index based on the cost information; generating, when the economic benefit index is greater than or equal to an economic benefit index threshold, a net-zero annual carbon emission index based on the carbon emission management information; issuing, when the net-zero annual carbon emission index is less than or equal to the net-zero annual carbon emission index threshold, instruction to the intelligent central dispatch platform, such that the intelligent central dispatch platform performs a distributed dispatch allocation on the distributed virtual power plants based on the net-zero annual carbon emission index, thereby generating a dispatch weight of each of the distributed virtual power plants and a participable capacity that each of the distributed virtual power plants is capable of participating in power trading auxiliary services, in which each of the distributed virtual power plants generates an actual planning participating capacity that each of the distributed virtual power plants actually participates in the power trading auxiliary services based on the participable capacity of each of the distributed virtual power plants; calculating an execution rate of the intelligent central dispatch platform after the distributed dispatch allocation; issuing, when the execution rate is less than or equal to an execution rate threshold, instruction to the intelligent central dispatch platform, such that the intelligent central dispatch platform repeatedly performs the distributed dispatch allocation by increasing the dispatch weight of each of the distributed virtual power plants until the execution rate is greater than the execution rate threshold; generating, when the execution rate is greater than the execution rate threshold, the net-zero annual carbon emission index after the distributed dispatch allocation based on the carbon emission management information after the distributed dispatch allocation; and issuing, when the net-zero annual carbon emission index after the distributed dispatch allocation is greater than the net-zero annual carbon emission index threshold, instruction to the intelligent central dispatch platform, such that the intelligent central dispatch platform repeatedly performs the distributed dispatch allocation until the net-zero annual carbon emission index after the distributed dispatch allocation is less than or equal to the net-zero annual carbon emission index threshold.

In accordance with one or more embodiments of the invention, when the actual planning participating capacity of each of the distributed virtual power plants is greater than a limit threshold, each of the distributed virtual power plants participates in a bidding of a power trading platform of the TPC by itself. When the actual planning participating capacity of at least one of the distributed virtual power plants is less than or equal to the limit threshold, the intelligent central dispatch platform aggregates the actual planning participating capacity of each of the distributed virtual power plants, and then the intelligent central dispatch platform participates in the bidding of the power trading platform according to the dispatch weight and the aggregated actual planning participating capacity of each of the distributed virtual power plants.

In accordance with one or more embodiments of the invention, when the net-zero annual carbon emission index after the distributed dispatch allocation is greater than the net-zero annual carbon emission index threshold, the dispatch weight of a first distributed virtual power plant of the distributed virtual power plants is increased the zero carbon electricity of the distributed energy resources, and the dispatch weight of a second distributed virtual power plant of the distributed virtual power plants is decreased the carbon-inclusive electricity of the distributed energy resources, thereby adjusting the net-zero annual carbon emission index, such that the intelligent central dispatch platform re-performs the distributed dispatch allocation on the distributed virtual power plants based on the adjusted net-zero annual carbon emission index. A first green energy power generation amount of the first distributed virtual power plant is greater than a second green energy power generation amount of the second distributed virtual power plant.

Therefore, by applying the embodiments of the present invention, the manner for dispatching the power resources of the distributed virtual power plants can be obtained, and the requirements of enterprise economic benefit and net zero carbon emission can be satisfied at the same time.

BRIEF DESCRIPTION OF THE DRAWINGS

In order to let above mention of the present invention and other objects, features, advantages, and embodiments of the present invention to be more easily understood, the description of the accompanying drawing as follows. Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
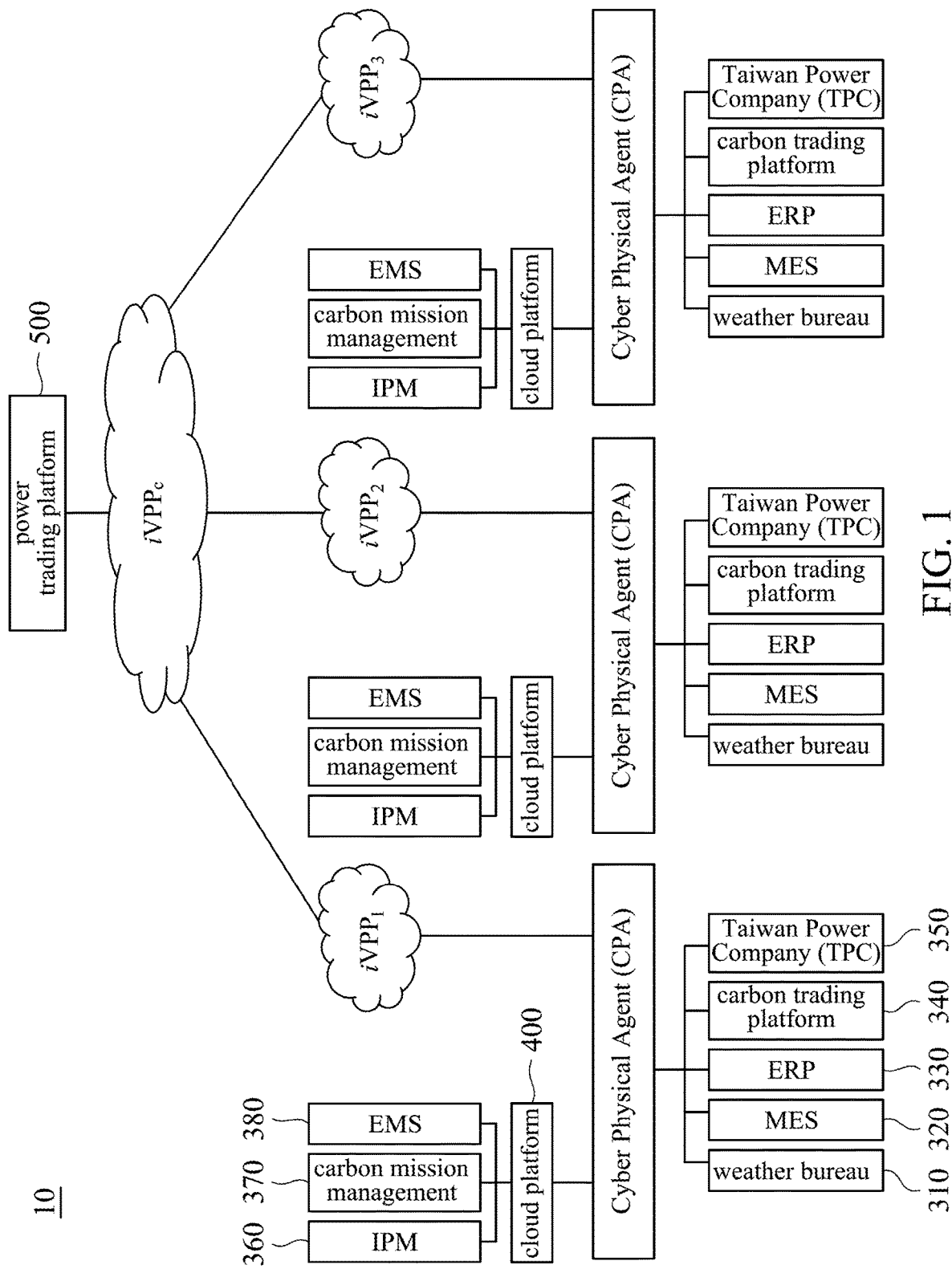
FIG. 1 illustrates a block diagram of a hybrid system for distributed virtual power plants integrated intelligent net zero according to some embodiments of the present invention.
Figure 2:
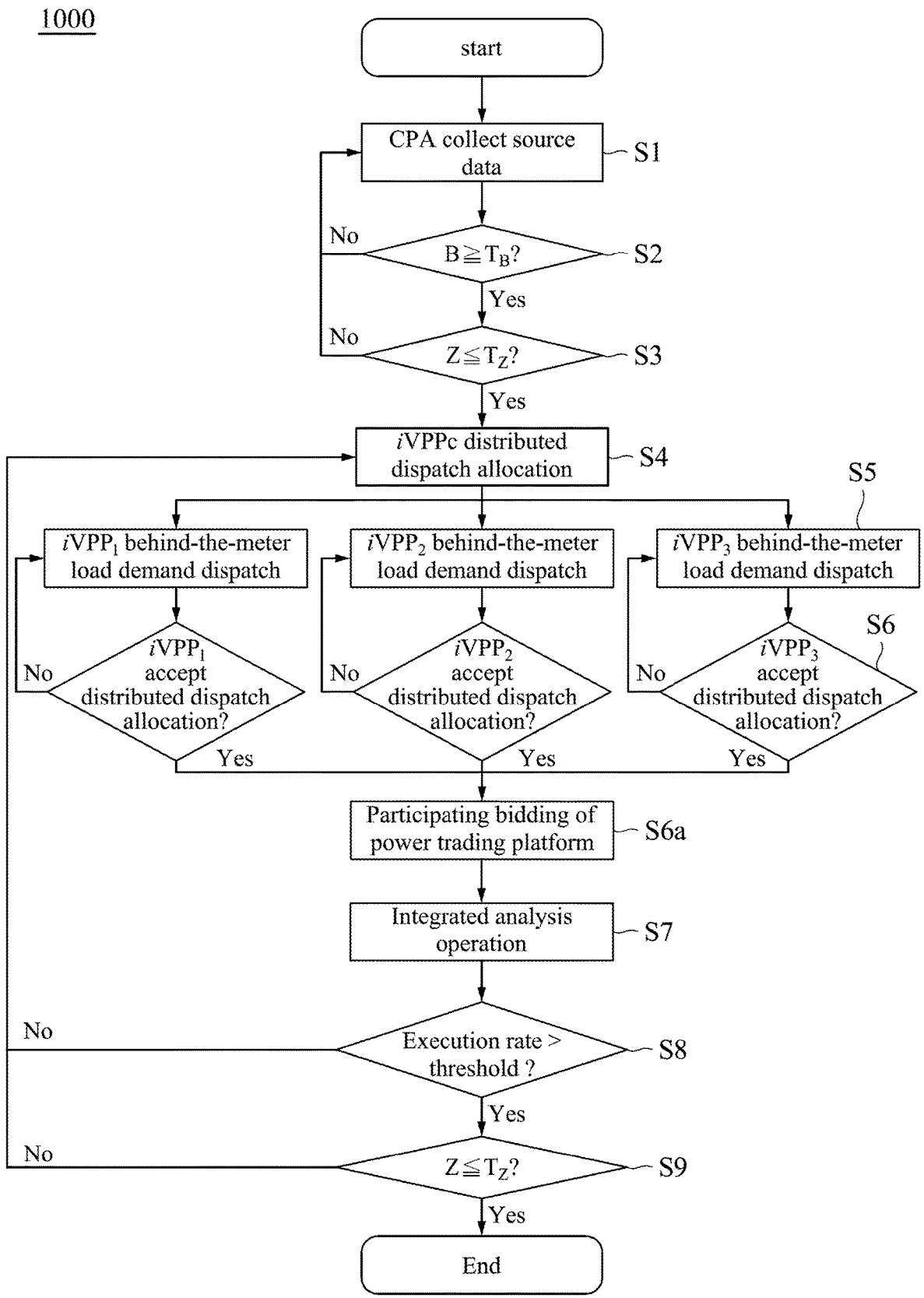
FIG. 2 illustrates a flow chart of a hybrid method for distributed virtual power plants integrated intelligent net zero according to some embodiments of the present invention.

FIG. 1 illustrates a block diagram of a hybrid system 10 for distributed virtual power plants integrated intelligent net zero according to some embodiments of the present invention. FIG. 2 illustrates a flow chart of a hybrid method 1000 for distributed virtual power plants integrated intelligent net zero according to some embodiments of the present invention.

As shown in FIG. 1, the hybrid system 10 for distributed virtual power plants integrated intelligent net zero includes an intelligent central dispatch platform iVPP$_c$, plural distributed virtual power plants iVPP$_1$, iVPP$_2$, iVPP$_3$, plural cyber physical agents (CPAs) and a cloud platform 400. The distributed virtual power plants iVPP$_1$, iVPP$_2$, iVPP$_3$ are communicatively connected to the intelligent central dispatch platform iVPP$_c$ via the cloud platform 400. The CPAs are communicatively connected to the distributed virtual power plants $iVPP_1$, $iVPP_2$, $iVPP_3$, respectively, and therefore the number of the distributed virtual power plants is the same as the number of the cyber physical agents. It should be understood that the number of the distributed virtual power plants and the number of the cyber physical agents as shown in FIG. 1 are merely an example, and the present invention is not limited thereto.

The multiple distributed virtual power plants are substantially regional virtual power plants located in different regions. For example, the multiple distributed virtual power plants $iVPP_1$, $iVPP_2$, $iVPP_3$ are regional virtual power plants located in the north region, the central region, and the south region, respectively. The power type of each of the distributed virtual power plants is distributed energy resources (DERs). The power source of the distributed energy resources includes fossil fuels, alternative fuels and/or green energy (renewable energy), such as but not limited to: hydrogen energy, biogas power generation, wind power generation, solar energy, ocean energy, geothermal energy, biomass energy, lignin power generation, diesel power generation, thermal power generation and/or battery energy storage, etc.

The intelligent central dispatch platform $iVPP_c$ is communicatively connected to a power trading platform 500 of the Taiwan Power Company (TPC) and the distributed virtual power plants $iVPP_1$, $iVPP_2$, $iVPP_3$. The intelligent central dispatch platform $iVPP_c$ dispatches the power resources of the distributed virtual power plants $iVPP_1$, $iVPP_2$, $iVPP_3$ through the power aggregation manner to participate in a bidding of the power (trading) auxiliary services of the power trading platform 500, thereby selling the dispatchable power resources of the distributed virtual power plants $iVPP_1$, $iVPP_2$, $iVPP_3$ to the TPC through the power trading platform 500 so as to increase the economy income. Specifically, as the issue of environmental carbon reduction has become more and more important, the present invention expects that a power aggregation dispatching of power resources of the distributed virtual power plants $iVPP_1$, $iVPP_2$, $iVPP_3$ that the intelligent central dispatch platform $iVPP_c$ is performed can reduce the proportion of fossil fuels in distributed energy resources while increasing the proportion of green/renewable energy in distributed energy resources, in order to achieve the goal of net zero carbon emissions.

Each CPA belongs to the Internet of Things (IoT) component. Each CPA has a communication module, a pluggable machine data exchange module, a pluggable application program module, a data collection module and a kernel module. The communication module is configured to communicate with the cloud platform 400, and can upload the pre-processed data to the server of the cloud platform 400 for storage, or otherwise accept the instructions of the services of the cloud platform 400. The pluggable machine data exchange module is configured to integrate the source data of different sources, different formats and different processing methods, or to transmit commands to the related equipment. The pluggable application program module is configured to extract the parameter features and to filter and extract the target data, etc. The data collection module has the conditions that can be planned to trigger data collection, and the data collection process will be performed when the status satisfies the said conditions. The kernel module is configured to coordinate the operations of the above modules, such that the CPA can automatically perform data collection, parameter feature calculation and external data transmission. In another embodiment, the above-mentioned CPAs may be based on U.S. Pat. No. 10,618,137B2, which is hereby incorporated by reference.

Each CPA communicates with the weather bureau (weather station) 310 to obtain the weather information. Specifically, the cyber physical agent CPA downloads the data from the weather station of the weather bureau, thereby obtaining the latest measurement value. The frequency that the CPA collects the weather information is once every hour.

Each CPA communicates with the databases of the manufacturing execution systems (MES) 320 located in different regions, thereby obtaining process measurement data. For example, the cyber physical agent CPA communicated with the distributed virtual power plant $iVPP_1$ is communicatively connected to the manufacturing execution system (MES) 320 of the production line in the region where the distributed virtual power plant $iVPP_1$ is located, and so on. The MES 320 is used to actively collect and monitor the process measurement data generated during the manufacturing process so as to ensure the production quality of the products or workpieces. In detail, the CPA obtains the process measurement data from the database of the manufacturing execution system (MES) 320 through an API application (such as an ODBC function) using SQL syntax. The frequency that the cyber physical agent CPA collects the process measurement data is once every 15 minutes.

Each CPA communicates with the databases of enterprise resource planning (ERP) systems 330 located in different regions so as to obtain raw material information, such as raw material cost (supply chain management) and bill of materials (BOM). For example, the cyber physical agent CPA communicated with the distributed virtual power plant $iVPP_1$ is communicatively connected to the enterprise resource planning (ERP) system 330 of the production line in the region where the distributed virtual power plant $iVPP_1$ is located, and so on. The enterprise resource planning (ERP) system 330 is used to indicate the structural relationship between the item numbers and the amount of raw materials, semi-finished products and finished products. In detail, the cyber physical agent CPA uses SQL syntax to obtain raw material information from the database of the enterprise resource planning (ERP) system 330 through an API application (such as an ODBC function). The frequency that the CPA collects the raw material information is once every 15 minutes.

Each CPA communicates with the carbon trading platform (international carbon trading platform) 340 to obtain the carbon price. In detail, the CPA communicates with various international carbon trading platforms, and aggregates the carbon prices of various international carbon trading platforms to calculate the average value of carbon prices. In embodiments of the present invention, the carbon price obtained by the CPA includes the carbon price of the previous day (i.e., the day-ahead carbon price) and the carbon price of the current day.

Each CPA communicates with the TPC 350 to obtain the bidding results of participating the power trading auxiliary services of the TPC or demand response, in which the bidding results include the total price (i.e., the day-ahead total price) issued to the TPC for participating power trading auxiliary service of the TPC at the previous day. In detail, the CPA uses a web crawler to filter and obtain trading price data.

Each CPA communicates with the intelligent predictive maintenance (IPM) systems 360 located in different regions through the cloud platform 400. For example, the CPA communicated with the distributed virtual power plant $iVPP_1$ is communicatively connected to the intelligent predictive maintenance (IPM) system 360 of production lines and factory affairs in the region where the distributed virtual power plant $iVPP_1$ is located, and so on. The intelligent predictive maintenance (IPM) system 360 is used to monitor the factory equipment and production equipment. Each CPA communicates with the intelligent predictive maintenance (IPM) system 360 through the cloud platform 400 to obtain the monitoring information of the factory equipment and production equipment. The aforementioned monitoring information includes the cost of operation and maintenance of factory equipment and production equipment. Specifically, the intelligent predictive maintenance (IPM) system 360 is used to monitor the machine condition (such as machine health status) of factory equipment and production equipment, thereby predicting the remaining life of the machine and quantifying as part of the production cost.

Each CPA communicates with the carbon emission management system 370 located in different regions through the cloud platform 400 to obtain carbon emission management information. The carbon emission management information includes, for example, the carbon emission amount of the factory/production equipment, the carbon emission amount of the product, the carbon verification boundary information, carbon emission coefficient, gas verification information, product/process planning, etc. For example, the cyber physical agent CPA communicated with the distributed virtual power plant $iVPP_1$ is communicatively connected to the carbon emission management system 370 of the production line and factory affairs in the region where the distributed virtual power plant $iVPP_1$ is located, and so on.

Each CPA communicates with the energy management system (EMS) 380 located in different regions through the cloud platform 400 to obtain energy management information. The energy management information includes factory information and carbon footprint. The factory information includes the time interval for power on/off the factory equipment and the available power of the production equipment (i.e., contracted electricity upper limit minus factory electricity consumption). For example, the CPA communicated with the distributed virtual power plant $iVPP_1$ is communicatively connected to the energy management system (EMS) 380 of production lines and factory affairs in the region where the distributed virtual power plant $iVPP_1$ is located, and so on.

The carbon emission management system 370 includes a carbon disclosure module, a carbon reduction module, and a carbon neutrality module. The energy management system (EMS) 380 includes a factory module and a microgrid integration module. The factory module receives factory information, including wastewater system information, pure water system information, air conditioning system information and air pollution system information. The microgrid integration module receives microgrid information including battery status information, power information, green energy power generation information and cogeneration information. The integrating operation of the carbon emission management system 370 and the energy management system (EMS) 380 is described below. The factory module of the energy management system (EMS) 380 provides the factory information to the carbon disclosure module of the carbon emission management system 370. The carbon disclosure module of the carbon emission management system 370 conducts carbon verification to obtain the carbon verification data according to the factory information. The carbon verification data is the carbon emissions (including the carbon emissions of factory/production equipment and the carbon emissions of products). The carbon verification data is provided to the factory module of the energy management system (EMS) 380. The carbon reduction module of the carbon emission management system 370 improves the manufacturing process of the product based on the raw material information so as to reduce the carbon emissions of products in the planning stage or the process stage (i.e., manufacturing process). The carbon reduction module of the carbon emission management system 370 provides product/process planning (including optimized product/process planning after considering carbon reduction) to the factory module of the energy management system (EMS) 380. The factory module of the energy management system (EMS) 380 utilizes fuzzy theory and genetic algorithm module to provide the carbon footprint (multiply actual power consumption by carbon coefficient) to the carbon neutrality module of the carbon emission management system 370 according to the product/process planning and carbon emissions. The carbon neutrality module of the carbon emission management system 370 receives green energy (including electricity generated by renewable energy (used to offset electricity of carbon neutrality)) from the microgrid integration module of the energy management system (EMS) 380 and obtains the amount of carbon offset by carbon neutrality according to the carbon footprint and green energy so as to provide the amount of carbon offset by carbon neutrality to the microgrid integration module of the energy management system (EMS) 380, thereby achieving net zero carbon emissions. In other words, the carbon emission management information of the carbon emission management system 370 includes the carbon emissions (including the carbon emission of the factory/production equipment and the carbon emission of the product) and the amount of carbon offset by carbon neutrality. The energy management information of the energy management system (EMS) 380 includes factory information, carbon footprint, and electricity generated by renewable energy (used to offset electricity of carbon neutrality). In detail, under the situation that the carbon emission cannot be reduced through a product process plan, the carbon neutrality module of the carbon emission management system 370 utilizes the low-carbon energy allocation manner to achieve the net zero carbon emission principle. The low-carbon energy allocation manner includes a carbon credit or a carbon offset, and the carbon credit represents the carbon emission credit for purchasing.

As shown in FIG. 2, in the step S1 of the hybrid method 1000 for distributed virtual power plants integrated intelligent net zero, the CPAs are configured to collect source data, and the collected source data includes the cost information (including the carbon price from the carbon trading platform 340 at the previous day and the day-ahead total price issued to the TPC 350 for participating power trading auxiliary service of the TPC 350 at the previous day), the carbon emission management information of the carbon emission management system 370, the raw material information of the enterprise resource planning (ERP) system 330, the process measuring data of the manufacturing execution system (MES) 320, the weather information of the weather bureau 310, the equipment monitoring information of the intelligent predictive maintenance (IPM) system 360, and the energy management information of the energy management system (EMS) 380. The cloud platform 400 communicates with the CPAs to obtain the source data. The cloud platform 400 communicates with the CPAs and is configured to implement steps S2-S6, S6a, S7-S9 of the hybrid method 1000 for distributed virtual power plants integrated intelligent net zero. In embodiments of the present invention, the cloud platform 400 may include a cloud processor and a cloud memory (database). The cloud memory may include random access memory (RAM) or other types of dynamic storage devices that can store information and instructions for the cloud processor to execute. The above information and instructions include streaming information management, blockchain and file systems. The cloud processor may include any type of processor, microprocessor, or Field Programmable Gate Array (FPGA) that is capable of compiling and executing instructions. A cloud processor may include a single device (e.g., a single core) or a group of devices (e.g., multiple cores).

After the step S1, the step S2 of the hybrid method 1000 for distributed virtual power plants integrated intelligent net zero is entered. At the step S2, the cloud platform 400 performs an economic profit assessing operation to determine whether the economic benefit index (B) is greater than or equal to the economic benefit index threshold ($T_B$) according to the cost information.

The cost information includes the total price ($Cost_{TPC}$) of the power trading platform, the power trading carbon price ($Cost_C$) and the loss cost ($\Sigma D_n$) of operation and maintenance of each equipment. The total price ($Cost_{TPC}$) is the total price issued to the TPC 350 for participating power trading auxiliary service of the TPC 350 at the previous day, and the total price ($Cost_{TPC}$) is obtained from the bidding results of participating the power trading auxiliary services of the TPC 350 or demand response at the previous day by the CPAs at the step S1. The power trading carbon price ($Cost_C$) includes the carbon price involved in power trading auxiliary service of the TPC 350 at the previous day and is obtained by converting the carbon price collected by the CPAs at the step S1. The loss cost ($\Sigma D_n$) of operation and maintenance of each equipment is obtained from the equipment monitoring information of the intelligent predictive maintenance (IPM) system 360 collected by the CPAs at the step S1. The loss cost ($\Sigma D_n$) of operation and maintenance of each equipment is substantially the cost of operation and maintenance of various factory equipment or production equipment. The economic benefit index threshold ($T_B$) is a percentage value determined by the enterprise/organization, such as 20%. In embodiments of the present invention, the economic benefit index (B) is represented by the following formula (1):

$$B = \frac{Cost_{TPC} - Cost_C - \sum D_n}{Cost_{TPC}} \quad (1)$$

Specifically, the economic profit assessing operation is used to objectively evaluate whether the power trading auxiliary services of the TPC at the previous day meets the economic benefit goal of the enterprise (i.e., the economic benefit index threshold value). The economic benefit index quantified by formula (1) not only purely considers money aspect, but also considers the amount of carbon related to factory and corporate actions.

At the step S2, when the determination result of the economic profit assessing operation is no (i.e., $B<T_B$), returning to the step S1 so as to re-collect (i.e., collect again) the raw material information of the enterprise resource planning (ERP) system 330, the process measuring data of the manufacturing execution system (MES) 320 and the weather information of the weather bureau 310, and then entering the step S2 to perform the economic profit assessing operation again.

At the step S2, when the determination result of the economic profit assessing operation is yes (i.e., $B \geq T_B$), the step S3 of the hybrid method 1000 for distributed virtual power plants integrated intelligent net zero is entered. At the step S3, the cloud platform 400 performs a net-zero assessing operation to determine whether the net-zero annual carbon emission index (Z) is less than or equal to the net-zero annual carbon emission index threshold ($T_Z$) according to the carbon emission management information.

The carbon emission management information is obtained from information collected by the CPAs at the step S1. The carbon emission management information includes a total Greenhouse Gas (GHG) emission ($\Sigma GAS_m$) converted by carbon dioxide equivalents of various types of greenhouse gases and a carbon credit trading volume (Cn). The various types of greenhouse gases may be, for example, carbon dioxide ($CO_2$), methane ($CH_4$), nitrous oxide ($N_2O$), hydrofluorocarbons (HFC), nitrogen trifluoride ($NF_3$), sulfur hexafluoride ($SF_6$) and other greenhouse gas group hydrofluorocarbons (HFCs), perfluorocarbons (PFCs), etc., and m=1, 2, . . . 7. Specifically, the net-zero assessing operation at the step S3 utilizes carbon emission management information such as carbon reduction, carbon neutrality (carbon offset, carbon trading, etc.) to evaluate whether the planned dispatch of the power trading auxiliary services participated at the previous day meets the net zero carbon emission principle (i.e., the net zero carbon emission principle cannot be violated). The net-zero annual carbon emission index threshold ($T_Z$) is a value determined by the enterprise/organization. In embodiments of the present invention, the net-zero annual carbon emission index (Z) is represented by the following formula (2):

$$Z = \Sigma GAS_m - Cn \quad (2)$$

At the step S3, when the determination result of the net-zero assessing operation is no (i.e., $Z > T_Z$), returning to the step S1 so as to re-collect (i.e., collect again) the raw material information of the enterprise resource planning (ERP) system 330, the process measuring data of the manufacturing execution system (MES) 320, the weather information of the weather bureau 310, and then entering the step S2 to perform the economic profit assessing operation again.

At the step S3, when the determination result of the net-zero assessing operation is yes (i.e., $Z \leq T_Z$), the step S4 of the hybrid method 1000 for distributed virtual power plants integrated intelligent net zero is entered. At the step S4, the cloud platform 400 sends instruction, such that the intelligent central dispatch platform $iVPP_c$ performs a distributed dispatch allocation on the distributed virtual power plants $iVPP_1$, $iVPP_2$, $iVPP_3$ based on the net-zero annual carbon emission index (Z).

In other words, in the present invention, the dispatch of power resources (i.e., the following step S4) is performed only when the economic benefit index in the step S2 is greater than or equal to the economic benefit index threshold (i.e., economic benefits are meet) and the net-zero annual carbon emission index (Z) in the step S3 is less than or equal to the net-zero annual carbon emission index threshold (i.e., satisfying the net zero carbon emission principle).

In embodiments of the present invention, the intelligent central dispatch platform $iVPP_c$ performs the distributed dispatch allocation on the distributed virtual power plants $iVPP_1$, $iVPP_2$, $iVPP_3$ based on the following formula (3) and formula (4):

$$\alpha_n = GA(Cap_n, Z, CEM) \quad (3)$$

$$Cap_C = \Sigma \alpha_n Cap_n - Lp \quad (4)$$

n corresponds to a certain distributed virtual power plant, and n=1, 2, 3 . . . . For example, n=1 corresponds to the relevant operations of the distributed virtual power plant iVPP$_1$, and so on. $\alpha_n$ is a dispatch weight of one of the distributed virtual power plants. For example, $\alpha_1$ is a dispatch weight of the distributed virtual power plant iVPP$_1$, and so on. In embodiments of the present invention, $0<\alpha_n<1$. In a preferred embodiment of the present invention, $0.5<\alpha_n\leq 1$. GA is an artificial intelligence (AI) algorithm function, such as genetic algorithm. The genetic algorithm can better search for the optimal solution globally. The genetic algorithm can avoid obtaining the local optimal solution through a multi-point search manner. Specifically, the present invention utilizes the genetic algorithm to make the distributed dispatch allocation of the distributed virtual power plants iVPP$_1$, iVPP$_2$, iVPP$_3$ performed by the intelligent central dispatch platform iVPP$_c$ to be optimal allocation. Cap$_n$ is the participable capacity that the one of the distributed virtual power plants is capable of participating in power trading auxiliary services. For example, Cap$_1$ is the participable capacity of the distributed virtual power plant iVPP$_1$, and so on. Cap$_C$ is a participable capacity (total equipment capacity) that the intelligent central dispatch platform iVPP$_c$ can participate in the power trading auxiliary services. Cap$_n$ and Cap$_C$ are estimated by the microgrid integration module of the energy management system (EMS) 380 based on the energy consumption information of the factory equipment and the production equipment according to the multi-target genetic algorithm. CEM is a combination of equipment monitoring information, energy management information and weather information. The equipment monitoring information is collected by the CPAs at the step S1. For example, the equipment monitoring information represents information that a certain machine equipment is under maintenance or a certain machine equipment is scheduled to run, or a certain machine equipment life is coming to an end, so that a certain machine equipment cannot participate in dispatch of the intelligent central dispatch platform iVPP$_c$. Lp is the power loss generated when the intelligent central dispatch platform iVPP$_c$ implements power aggregation. Lp is substantially the bidding capacity of the intelligent central dispatch platform iVPP$_c$ (the biddable capacity for participating in the power trading auxiliary services) minus the measured value of smart meter (i.e., advanced metering infrastructure, AMI) of the TPC.

Specifically, at the step S4, the intelligent central dispatch platform iVPP$_c$ performs the optimal dispatch based on the participable capacity of each of the distributed virtual power plants iVPP$_1$, iVPP$_2$, iVPP$_3$ which is reported from each of the distributed virtual power plants iVPP$_1$, iVPP$_2$, iVPP$_3$ to the intelligent central dispatch platform iVPP$_c$. The intelligent central dispatch platform iVPP$_c$ utilizes the artificial intelligence algorithm to calculate the dispatch weight of each of the distributed virtual power plants iVPP$_1$, iVPP$_2$, iVPP$_3$ that can be dispatched by the intelligent central dispatch platform iVPP$_c$, so that the intelligent central dispatch platform iVPP$_c$ can subsequently implement the power aggregation according to the dispatch weight of each of the distributed virtual power plants iVPP$_1$, iVPP$_2$, iVPP$_3$.

After the step S4, the step S5 of the hybrid method 1000 for distributed virtual power plants integrated intelligent net zero is entered. At the step S5, the cloud platform 400 sends instruction, such that each of the distributed virtual power plants iVPP$_1$, iVPP$_2$, iVPP$_3$ performs a behind-the-meter load demand dispatch according to the distributed dispatch allocation of the step S4.

In embodiments of the present invention, each of the distributed virtual power plants iVPP$_1$, iVPP$_2$, iVPP$_3$ performs the behind-the-meter load demand dispatch based on the following formula (5):

$$\overline{Cap}_n = Cap_E + Cap_{STO} + Cap_{DER} + Cap_{GEN} - UA_n \quad (5)$$

$\overline{Cap}_n$ is the actual planning participating capacity of the one of the distributed virtual power plants. For example, $\overline{Cap}_1$ is the actual planning participating capacity of the distributed virtual power plant iVPP$_1$, and so on. Cap$_E$ is a maximum capacity that the one of the distributed virtual power plants can be dispatched for the factory scheduling and energy saving. Cap$_{STO}$ is an available capacity of the energy storage system of the one of the distributed virtual power plants. Cap$_{DER}$ is a maximum capacity of grid-connected distributed energy sources of the one of the distributed virtual power plants. Cap GEN is a diesel generator capacity of the one of the distributed virtual power plants. UA$_n$ is a non-dispatchable capacity that the one of the distributed virtual power plants cannot dispatch. UA$_n$ substantially corresponds to the important operating equipment of one of the distributed virtual power plants, and the said important operating equipment cannot be dispatched by the intelligent central dispatch platform iVPP$_c$. For example, UA$_1$ is a non-dispatchable capacity that the distributed virtual power plant iVPP$_1$ cannot dispatch, and so on. Cap$_E$, Cap$_{STO}$, Cap$_{DER}$, CaP$_{GEN}$ are obtained from the energy management information collected by the CPAs at the step S1.

Specifically, at the step S5, each of the distributed virtual power plants iVPP$_1$, iVPP$_2$, iVPP$_3$ performs DERs dispatch and load demand control according to the instructions of the distributed dispatch allocation of the intelligent central dispatch platform iVPP$_c$, thereby calculating the actual planning participating capacity of each of the distributed virtual power plants iVPP$_1$, iVPP$_2$, iVPP$_3$ accordingly.

After the step S5, the step S6 of the hybrid method 1000 for distributed virtual power plants integrated intelligent net zero is entered. At the step S6, the intelligent central dispatch platform iVPP$_c$ sends instruction to each of the distributed virtual power plants iVPP$_1$, iVPP$_2$, iVPP$_3$, such that each of the distributed virtual power plants iVPP$_1$, iVPP$_2$, iVPP$_3$ determines whether the factory equipment and production equipment of each of the distributed virtual power plants iVPP$_1$, iVPP$_2$, iVPP$_3$ are running normally according to the energy management information of the energy management system (EMS) 380 of each of the distributed virtual power plants iVPP$_1$, iVPP$_2$, iVPP$_3$, so that each of the distributed virtual power plants iVPP$_1$, iVPP$_2$, iVPP$_3$ can accept the distributed dispatch allocation from the intelligent central dispatch platform iVPP$_c$.

When the determination result of the step S6 is no, returning to the step S5, so that the cloud platform 400 sends instruction, such that each of the distributed virtual power plants iVPP$_1$, iVPP$_2$, iVPP$_3$ re-performs a behind-the-meter load demand dispatch according to the actual distributed dispatch allocation, thereby re-calculating the actual planning participating capacity of each of the distributed virtual power plants iVPP$_1$, iVPP$_2$, iVPP$_3$.

When the determination result of the step S6 is yes, the step S6a of the hybrid method 1000 for distributed virtual power plants integrated intelligent net zero is entered. On the one hand, at the step S6a, when the cloud platform 400 determines that the actual planning participating capacity of each of the distributed virtual power plants iVPP$_1$, iVPP$_2$, iVPP$_3$ is greater than a limit threshold (e.g., 1 MW), the cloud platform 400 issues instruction, such that each of the distributed virtual power plants iVPP$_1$, iVPP$_2$, iVPP$_3$ participates in the bidding of the power trading platform 500 of the TPC on the current day by itself. On the other hand, at the step S6a, when the cloud platform 400 determines that the actual planning participating capacity of at least one of the distributed virtual power plants iVPP$_1$, iVPP$_2$, iVPP$_3$ is less than or equal to the limit threshold (e.g., 1 MW), the cloud platform 400 issues instruction, such that the intelligent central dispatch platform iVPP$_c$ aggregates the actual planning participating capacity of each of the distributed virtual power plants iVPP$_1$, iVPP$_2$, iVPP$_3$, and then the intelligent central dispatch platform iVPP$_c$ participates in the bidding of the power trading platform 500 of the TPC on the current day according to the dispatch weight and the aggregated actual planning participating capacity of each of the distributed virtual power plants iVPP$_1$, iVPP$_2$, iVPP$_3$, i.e., $\Sigma\alpha_n\overline{Cap}_n$. In other words, if the distributed energy resources (DER) in charge of the distributed virtual power plants iVPP$_1$, iVPP$_2$, iVPP$_3$ have unexpected abnormal events or the actual planning participating capacity of at least one of the distributed virtual power plants iVPP$_1$, iVPP$_2$, iVPP$_3$ is less than or equal to the limit threshold, the distributed virtual power plants iVPP$_1$, iVPP$_2$, iVPP$_3$ are dispatched by the intelligent central dispatch platform iVPP$_c$ and the intelligent central dispatch platform iVPP$_c$ participate in the bidding of the power trading platform 500 of the TPC on the current day.

After the step S6a, the step S7 of the hybrid method 1000 for distributed virtual power plants integrated intelligent net zero is entered. At the step S7, the cloud platform 400 performs an integrated analysis operation to calculate a post-dispatch economic benefit index ($\overline{B}$) according to a post-dispatch cost information. The post-dispatch cost information includes a post-dispatch total price ($\overline{Cost}_{TPC}$) of the power trading platform, a post-dispatch power trading carbon price ($\overline{Cost}_C$) and a post-dispatch loss cost ($\Sigma\overline{D}_n$) of operation and maintenance of each equipment. The post-dispatch total price ($\overline{Cost}_{TPC}$) of the power trading platform is obtained by the smart meter (i.e., advanced metering infrastructure, AMI) of the TPC. The post-dispatch power trading carbon price ($\overline{Cost}_C$) includes the carbon price involved in power trading auxiliary service at the current day and is obtained by converting the current day carbon price collected by the CPAs at the step S1. The post-dispatch loss cost ($\Sigma\overline{D}_n$) of operation and maintenance of each equipment is obtained from the equipment monitoring information of the IPM system and the measured value of the smart meter of the TPC. In embodiments of the present invention, the post-dispatch economic benefit index (B) is represented by the following formula (6):

$$\overline{B} = \frac{\overline{Cost}_{TPC} - \overline{Cost}_C - \sum \overline{D}_n}{\overline{Cost}_{TPC}}. \quad (6)$$

Specifically, the step S7 is used to analyze whether the post-dispatch economic benefit index ($\overline{B}$) after the distributed dispatch allocation, the behind-the-meter load demand dispatch, and participation in the bidding of the power trading platform of the TPC can still be greater than or equal to the post-dispatch economic benefit index threshold ($T_{\overline{B}}$). The post-dispatch economic benefit index threshold ($T_B$) is an allowable economic benefit index threshold after dispatch. In some embodiments of the present invention, the post-dispatch economic benefit index threshold ($T_{\overline{B}}$) is equal to the economic benefit index threshold ($T_B$). In some other embodiments of the present invention, the post-dispatch economic benefit index threshold ($T_{\overline{B}}$) is less than the economic benefit index threshold ($T_B$). In some other embodiments of the present invention, the reason that the post-dispatch economic benefit index threshold ($T_{\overline{B}}$) is less than the economic benefit index threshold ($T_B$) is that the equipment maintenance or the equipment aging after dispatch should be considered, so that the difference between the post-dispatch economic benefit index threshold ($T_{\overline{B}}$) and the economic benefit index threshold ($T_B$) is an acceptable error range.

In embodiments of the present invention, when $\overline{B}<T_{\overline{B}}$ and $\overline{B}$ is close to $T_{\overline{B}}$, the cloud platform 400 records the post-dispatch economic benefit index ($\overline{B}$) as the dispatch benefit data, which is used as a reference, analysis and adjustment for the dispatch value in the future. For example, the post-dispatch economic benefit index ($\overline{B}$) is used as the basis for adjusting the parameters of the enterprise resource planning (ERP) 330 system or the basis for adjusting the post-dispatch economic benefit index threshold ($T_{\overline{B}}$). In embodiments of the present invention, when $\overline{B}<<T_{\overline{B}}$, the step S8 of the hybrid method 1000 for distributed virtual power plants integrated intelligent net zero is entered. At the step S8, the cloud platform 400 determines whether the distributed dispatch allocation performed by the intelligent central dispatch platform iVPP$_c$ fails to meet the actual demand of the intelligent central dispatch platform iVPP$_c$.

After the step S7, the step S8 of the hybrid method 1000 for distributed virtual power plants integrated intelligent net zero is entered. At the step S8, the cloud platform 400 performs a dispatch demand assessing operation to determine whether an execution rate of the intelligent central dispatch platform iVPP$_c$ after the behind-the-meter load demand dispatch is greater than an execution rate threshold. The execution rate of the intelligent central dispatch platform iVPP$_c$ after the behind-the-meter load demand dispatch is a ratio of the measured value of the smart meter of the TPC to the bid capacity of the intelligent central dispatch platform iVPP$_c$. In embodiments of the present invention, the execution rate threshold is a percentage value determined by the enterprise/organization, such as 85%.

At the step S8, when the determination result of the dispatch demand assessing operation is no (i.e., the execution rate of the intelligent central dispatch platform iVPP$_c$ after the behind-the-meter load demand dispatch is less than or equal to the execution rate threshold), returning to the step S4, such that the cloud platform 400 sends instruction, such that the intelligent central dispatch platform iVPP$_c$ re-performs the distributed dispatch allocation on the distributed virtual power plants iVPP$_1$, iVPP$_2$, iVPP$_3$ based on the bid capacity of the intelligent central dispatch platform iVPP$_c$ after the behind-the-meter load demand dispatch, thereby adjusting (i.e., increasing) the dispatch weight of each of the distributed virtual power plants iVPP$_1$, iVPP$_2$, iVPP$_3$ until the execution rate is greater than the execution rate threshold.

At the step S8, when the determination result of the dispatch demand assessing operation is yes (i.e., the execution rate of the intelligent central dispatch platform iVPP$_c$ after the behind-the-meter load demand dispatch is greater than the execution rate threshold), the step S9 of the hybrid method 1000 for distributed virtual power plants integrated intelligent net zero is entered. At the step S9, the cloud platform 400 performs a post-dispatch net-zero assessing operation to determine whether the net-zero annual carbon emission index (Z) after the behind-the-meter load demand dispatch is less than or equal to the net-zero annual carbon emission index threshold ($T_Z$) according to the carbon emission management information after the behind-the-meter load demand dispatch.

At the step S9, when the determination result of the post-dispatch net-zero assessing operation is no (i.e., $Z>T_Z$), returning to the step S4, such that the cloud platform 400 utilizes the carbon reduction module and the carbon neutrality module of the carbon emission management system 370 to perform carbon change (e.g., carbon offset and/or carbon trade) and carbon credit adjustment (e.g., carbon neutrality) until the net-zero annual carbon emission index (Z) after the behind-the-meter load demand dispatch in the step S9 is less than or equal to the net-zero annual carbon emission index threshold ($T_Z$).

The aforementioned carbon credit adjustment is used to adjust the amount for trading carbon credit so as to adjust the net-zero annual carbon emission index (Z) after the behind-the-meter load demand dispatch, such that the intelligent central dispatch platform $iVPP_c$ re-performs (in the step S4) the distributed dispatch allocation on the distributed virtual power plants $iVPP_1$, $iVPP_2$, $iVPP_3$ based on the adjusted net-zero annual carbon emission index (Z).

The aforementioned carbon change is used to increase the dispatch weight of a first distributed virtual power plant of the distributed virtual power plants (i.e., increase the zero carbon electricity of the distributed energy resources) and to decrease the dispatch weight of a second distributed virtual power plant of the distributed virtual power plants (i.e., decrease the carbon-inclusive electricity of the distributed energy resources), thereby adjusting the net-zero annual carbon emission index (Z), such that the intelligent central dispatch platform $iVPP_c$ re-performs (in the step S4) the distributed dispatch allocation on the distributed virtual power plants based on the adjusted net-zero annual carbon emission index (Z). The green energy power generation amount of the first distributed virtual power plant is greater than the green energy power generation amount of the second distributed virtual power plant. In other words, the carbon change is used to increase the proportion of green energy generation and reducing the proportion of non-green energy generation, so that the overall carbon cost can be greatly reduced without affecting or slightly affecting the overall economic benefits, and thus the adjusted net-zero annual carbon emission index (Z) can be less than or equal to the net-zero annual carbon emission index threshold ($T_Z$).

At the step S9, when the determination result of the post-dispatch net-zero assessing operation is yes (i.e., $Z<T_Z$), the cloud platform 400 ends the hybrid method 1000 for distributed virtual power plants integrated intelligent net zero.

Specifically, according to the hybrid method 1000 for distributed virtual power plants integrated intelligent net zero as shown in FIG. 2, the biggest difference between the present invention and the traditional virtual power plant is that the power dispatch of the distributed virtual power plant is no longer purely considers money aspect, the present invention further considers the amount of carbon related to factory equipment and production equipment, and thus the present invention can effectively link the power dispatch of distributed virtual power plants with carbon emission information, thereby satisfying the net zero carbon emission principle. The present invention strengthens the power dispatch of distributed virtual power plants, and assists enterprises to actually participate in the power trading auxiliary services of the TPC, and meets the benefits of carbon reduction and energy virtual dispatch, so that enterprises can generate revenue while maintaining power stability and green sustainability, thereby achieving the goals of net zero carbon emission and net zero transformation.

It can be understood that the hybrid method 1000 for distributed virtual power plants integrated intelligent net zero of the present invention performs the above-mentioned implementation steps, and the computer program product of the present invention is used to complete the above-mentioned hybrid method 1000 for distributed virtual power plants integrated intelligent net zero. The order of each implementation step described in the above embodiments may be adjusted, combined or omitted according to actual needs. The above-described embodiments may be implemented by using a computer program product, which may include a machine-readable medium storing plural instructions for programming the computer to perform the steps of the above-described embodiments. Machine-readable media can be, but are not limited to, floppy disks, optical disks, CD-ROMs, magneto-optical disks, read-only memory, random access memory, erasable programmable read-only memory (EPROM), electronically erasable programmable read only memory (EEPROM), optical card or magnetic cards, flash memory, or any machine-readable medium suitable for storing electronic instructions. Furthermore, the embodiments of the present invention can also be downloaded as a computer program product, which can transfer the computer program product of the present invention from a remote computer to the requesting computer by using data signals of a communication connection (e.g., a connection such as a network connection).

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hybrid method for distributed virtual power plants integrated intelligent net zero, comprising:
    performing an economic profit assessing operation to determine whether an economic benefit index is greater than or equal to an economic benefit index threshold;
    performing, when a determination result of the economic profit assessing operation is yes, a net-zero assessing operation to determine whether a net-zero annual carbon emission index is less than or equal to a net-zero annual carbon emission index threshold according to a carbon emission management information;
    performing, by an intelligent central dispatch platform when a determination result of the net-zero assessing operation is yes, a distributed dispatch allocation on a plurality of distributed virtual power plants based on the net-zero annual carbon emission index, wherein the distributed dispatch allocation includes a participable capacity that each of the distributed virtual power plants is capable of participating in power trading auxiliary services;
    performing, by each of the distributed virtual power plants, a behind-the-meter load demand dispatch according to the distributed dispatch allocation, wherein the behind-the-meter load demand dispatch includes an actual planning participating capacity that each of the distributed virtual power plants actually participates in the power trading auxiliary services;

performing a dispatch demand assessing operation to determine whether an execution rate of the intelligent central dispatch platform after the behind-the-meter load demand dispatch is greater than an execution rate threshold;

performing, when a determination result of the dispatch demand assessing operation is yes, a post-dispatch net-zero assessing operation to determine whether the net-zero annual carbon emission index after the behind-the-meter load demand dispatch is less than or equal to the net-zero annual carbon emission index threshold according to the carbon emission management information after the behind-the-meter load demand dispatch; and repeatedly performing the distributed dispatch allocation, when a determination result of the post-dispatch net-zero assessing operation is no, until the net-zero annual carbon emission index after the behind-the-meter load demand dispatch is less than or equal to the net-zero annual carbon emission index threshold.

2. The hybrid method of claim 1, further comprising:
collecting, by a plurality of cyber physical agents (CPAs) before the economic profit assessing operation is performed, a cost information, the carbon emission management information, a raw material information of an enterprise resource planning (ERP) system, a process measuring data of a manufacturing execution system (MES), a weather information, an equipment monitoring information and an energy management information of an intelligent predictive maintenance (IPM) system;

wherein the economic profit assessing operation is performed according to the cost information.

3. The hybrid method of claim 2, further comprising:
re-collecting, by the CPAs, the raw material information of the ERP system and the process measuring data of the MES when the determination result of the economic profit assessing operation or the determination result of the net-zero assessing operation is no, and then re-performing the economic profit assessing operation.

4. The hybrid method of claim 2, wherein the cost information includes a total price ($Cost_{TPC}$) of a power trading platform, a power trading carbon price ($Cost_C$) and a loss cost ($\Sigma D_n$) of operation and maintenance of each equipment, wherein the loss cost ($\Sigma D_n$) of operation and maintenance of each equipment is obtained from the equipment monitoring information, wherein the economic benefit index (B) is represented by:

$$B = \frac{Cost_{TPC} - Cost_C - \sum D_n}{Cost_{TPC}}.$$

5. The hybrid method of claim 2, wherein the carbon emission management information includes a total Greenhouse Gas (GHG) emission ($\Sigma GAS_m$) converted by carbon dioxide equivalents of various types of greenhouse gases and a carbon credit trading volume (Cn), wherein the net-zero annual carbon emission index (Z) is represented by:

$$Z = \Sigma GAS_m - Cn.$$

6. The hybrid method of claim 5, wherein the execution rate of the intelligent central dispatch platform is a ratio of a measured value of a smart meter of a Taiwan Power Company (TPC) to a bid capacity of the intelligent central dispatch platform.

7. The hybrid method of claim 6, wherein the intelligent central dispatch platform performs the distributed dispatch allocation according to following formulas:

$$\alpha_n = GA(Cap_n, Z, CEM);$$

$$Cap_C = \Sigma \alpha_n Cap_n - Lp;$$

wherein $\alpha_n$ is a dispatch weight of one of the distributed virtual power plants, wherein $0 < \alpha_n \leq 1$, wherein GA is an artificial intelligence (AI) algorithm function, wherein $Cap_n$ is the participable capacity of the one of the distributed virtual power plants, wherein $Cap_C$ is a participable capacity that the intelligent central dispatch platform can participate in the power trading auxiliary services, wherein CEM is a combination of the equipment monitoring information, the energy management information and the weather information, wherein Lp is a value that the bid capacity of the intelligent central dispatch platform minus the measured value of the smart meter of the TPC.

8. The hybrid method of claim 7, wherein the one of the distributed virtual power plants performs the behind-the-meter load demand dispatch according to following formula:

$$\overline{Cap_n} = Cap_E + Cap_{STO} + Cap_{DER} + Cap_{GEN} - UA_n,$$

wherein $\overline{Cap_n}$ is the actual planning participating capacity of the one of the distributed virtual power plants, wherein $Cap_E$ is a maximum capacity that the one of the distributed virtual power plants can be dispatched for factory scheduling and energy saving, wherein $Cap_{STO}$ is an available capacity of an energy storage system of the one of the distributed virtual power plants, wherein $Cap_{DER}$ is a maximum capacity of grid-connected distributed energy sources of the one of the distributed virtual power plants, wherein $Cap_{GEN}$ is a diesel generator capacity of the one of the distributed virtual power plants, wherein $UA_n$ is a non-dispatchable capacity that the one of the distributed virtual power plants cannot dispatch, wherein $Cap_E$, $Cap_{STO}$, $Cap_{DER}$, $Cap_{GEN}$ are obtained from the energy management information.

9. The hybrid method of claim 8, further comprising:
configuring, when the actual planning participating capacity of each of the distributed virtual power plants is greater than a limit threshold, each of the distributed virtual power plants to participate in a bidding of a power trading platform of a TPC by itself; and configuring, when the actual planning participating capacity of at least one of the distributed virtual power plants is less than or equal to the limit threshold, the intelligent central dispatch platform to aggregate the actual planning participating capacity of each of the distributed virtual power plants, and then configuring the intelligent central dispatch platform to participate in the bidding of the power trading platform according to the dispatch weight and the aggregated actual planning participating capacity of each of the distributed virtual power plants.

10. The hybrid method of claim 9, further comprising:
performing an integrated analysis operation, after the bidding of the power trading platform, to calculate a post-dispatch economic benefit index according to a post-dispatch cost information;

wherein the post-dispatch cost information includes a post-dispatch total price ($\overline{Cost}_{TPC}$) of the power trading platform, a post-dispatch power trading carbon price ($\overline{Cost}_C$) and a post-dispatch loss cost ($\Sigma\overline{D}_n$) of operation and maintenance of each equipment, wherein the post-dispatch loss cost ($\Sigma\overline{D}_n$) of operation and maintenance of each equipment is obtained from the equipment monitoring information of the IPM system and the measured value of the smart meter of the TPC, wherein the post-dispatch economic benefit index ($\overline{B}$) is represented by:

$$\overline{B} = \frac{\overline{Cost}_{TPC} - \overline{Cost}_C - \sum \overline{D}_n}{\overline{Cost}_{TPC}}.$$

11. The hybrid method of claim 7, further comprising: configuring, when the determination result of the dispatch demand assessing operation is no, the intelligent central dispatch platform to re-perform the distributed dispatch allocation on the distributed virtual power plants based on the net-zero annual carbon emission index after the behind-the-meter load demand dispatch, thereby adjusting the dispatch weight of each of the distributed virtual power plants.

12. The hybrid method of claim 5, further comprising: adjusting, when the net-zero annual carbon emission index after the behind-the-meter load demand dispatch is greater than the net-zero annual carbon emission index threshold, the carbon credit trading volume to adjust the net-zero annual carbon emission index, such that the intelligent central dispatch platform re-performs the distributed dispatch allocation on the distributed virtual power plants based on the adjusted net-zero annual carbon emission index.

13. The hybrid method of claim 7, further comprising: increasing, when the net-zero annual carbon emission index after the behind-the-meter load demand dispatch is greater than the net-zero annual carbon emission index threshold, the dispatch weight of a first distributed virtual power plant of the distributed virtual power plants and decreasing the dispatch weight of a second distributed virtual power plant of the distributed virtual power plants, thereby adjusting the net-zero annual carbon emission index, such that the intelligent central dispatch platform re-performs the distributed dispatch allocation on the distributed virtual power plants based on the adjusted net-zero annual carbon emission index; wherein a first green energy power generation amount of the first distributed virtual power plant is greater than a second green energy power generation amount of the second distributed virtual power plant.

14. A hybrid system for distributed virtual power plants integrated intelligent net zero, comprising:
an intelligent central dispatch platform;
a plurality of distributed virtual power plants communicatively connected to the intelligent central dispatch platform;
a plurality of cyber physical agents (CPAs) communicatively connected to the distributed virtual power plants, respectively, wherein the CPAs are configured to collect a cost information, a carbon emission management information, a raw material information of an enterprise resource planning (ERP) system, a process measuring data of a manufacturing execution system (MES), a weather information, an equipment monitoring information and an energy management information of an intelligent predictive maintenance (IPM) system; and
a cloud platform communicatively connected to the CPAs, wherein the distributed virtual power plants are communicatively connected to the intelligent central dispatch platform via the cloud platform, wherein the cloud platform is configured to perform following operations:
generating an economic benefit index based on the cost information;
generating, when the economic benefit index is greater than or equal to an economic benefit index threshold, a net-zero annual carbon emission index based on the carbon emission management information;
issuing, when the net-zero annual carbon emission index is less than or equal to a net-zero annual carbon emission index threshold, instruction to the intelligent central dispatch platform, such that the intelligent central dispatch platform performs a distributed dispatch allocation on the distributed virtual power plants based on the net-zero annual carbon emission index, thereby generating a dispatch weight of each of the distributed virtual power plants and a participable capacity that each of the distributed virtual power plants is capable of participating in power trading auxiliary services, wherein each of the distributed virtual power plants generates an actual planning participating capacity that each of the distributed virtual power plants actually participates in the power trading auxiliary services based on the participable capacity of each of the distributed virtual power plants;
calculating an execution rate of the intelligent central dispatch platform after the distributed dispatch allocation;
issuing, when the execution rate is less than or equal to an execution rate threshold, instruction to the intelligent central dispatch platform, such that the intelligent central dispatch platform re-performs the distributed dispatch allocation by increasing the dispatch weight of each of the distributed virtual power plants until the execution rate is greater than the execution rate threshold;
generating, when the execution rate is greater than the execution rate threshold, the net-zero annual carbon emission index after the distributed dispatch allocation based on the carbon emission management information after the distributed dispatch allocation; and
issuing, when the net-zero annual carbon emission index after the distributed dispatch allocation is greater than the net-zero annual carbon emission index threshold, instruction to the intelligent central dispatch platform, such that the intelligent central dispatch platform repeatedly performs the distributed dispatch allocation until the net-zero annual carbon emission index after the distributed dispatch allocation is less than or equal to the net-zero annual carbon emission index threshold.

15. The hybrid system of claim 14,
wherein when the actual planning participating capacity of each of the distributed virtual power plants is greater than a limit threshold, each of the distributed virtual power plants participates in a bidding of a power trading platform of a TPC by itself; and wherein when the actual planning participating capacity of at least one of the distributed virtual power plants is less than or equal to the limit threshold, the intelligent central dispatch platform aggregates the actual planning participating capacity of each of the distributed virtual power plants, and then the intelligent central dispatch platform participates in the bidding of the power trading platform according to the dispatch weight and the aggregated actual planning participating capacity of each of the distributed virtual power plants.

16. The hybrid system of claim 14, wherein when the net-zero annual carbon emission index after the distributed dispatch allocation is greater than the net-zero annual carbon emission index threshold, the dispatch weight of a first distributed virtual power plant of the distributed virtual power plants is increased zero carbon electricity of distributed energy resources, and the dispatch weight of a second distributed virtual power plant of the distributed virtual power plants is decreased carbon-inclusive electricity of the distributed energy resources, thereby adjusting the net-zero annual carbon emission index, such that the intelligent central dispatch platform re-performs the distributed dispatch allocation on the distributed virtual power plants based on the adjusted net-zero annual carbon emission index;

wherein a first green energy power generation amount of the first distributed virtual power plant is greater than a second green energy power generation amount of the second distributed virtual power plant.

\* \* \* \* \*